US009081413B2

(12) United States Patent
Wu et al.

(10) Patent No.: US 9,081,413 B2
(45) Date of Patent: Jul. 14, 2015

(54) HUMAN INTERACTION SYSTEM BASED UPON REAL-TIME INTENTION DETECTION

(71) Applicant: 3M Innovative Properties Company, St. Paul, MN (US)

(72) Inventors: Shuguang Wu, Austin, TX (US); Jun Xiao, Austin, TX (US); Glenn E. Casner, Woodbury, MN (US); John P. Baetzold, North Saint Paul, MN (US); Kenneth C. Reily, Austin, TX (US); Kandyce M. Bohannon, Cedar Park, TX (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 136 days.

(21) Appl. No.: 13/681,469

(22) Filed: Nov. 20, 2012

(65) Prior Publication Data

US 2014/0139420 A1 May 22, 2014

(51) Int. Cl.
*G09G 5/00* (2006.01)
*G06F 3/01* (2006.01)

(52) U.S. Cl.
CPC ................ *G06F 3/011* (2013.01); *G06F 3/017* (2013.01)

(58) Field of Classification Search
CPC ....... G06F 3/011; G06F 3/0304; G06F 3/017; A63F 13/06; G06K 9/00335; G06K 9/00369; G06K 9/00389; G06K 9/00771; G06K 9/00362; H04N 2005/91392; G06T 7/004
See application file for complete search history.

(56) References Cited

U.S. PATENT DOCUMENTS

| | | | | |
|---|---|---|---|---|
| 6,256,046 | B1 * | 7/2001 | Waters et al. | 345/473 |
| 6,531,999 | B1 * | 3/2003 | Trajkovic | 345/157 |
| 7,613,324 | B2 | 11/2009 | Venetianer | |
| 8,606,011 | B1 * | 12/2013 | Ivanchenko et al. | 382/176 |
| 8,606,735 | B2 * | 12/2013 | Cho et al. | 706/46 |
| 8,657,683 | B2 * | 2/2014 | Langridge et al. | 463/36 |
| 2006/0256083 | A1 * | 11/2006 | Rosenberg | 345/156 |
| 2007/0103552 | A1 | 5/2007 | Patel | |
| 2007/0298882 | A1 * | 12/2007 | Marks et al. | 463/36 |
| 2008/0030460 | A1 * | 2/2008 | Hildreth et al. | 345/156 |
| 2009/0100338 | A1 * | 4/2009 | Saetti | 715/716 |
| 2010/0053359 | A1 | 3/2010 | Mooradian | |
| 2010/0199228 | A1 * | 8/2010 | Latta et al. | 715/863 |
| 2010/0199232 | A1 * | 8/2010 | Mistry et al. | 715/863 |
| 2010/0266210 | A1 * | 10/2010 | Markovic et al. | 382/195 |
| 2010/0302138 | A1 * | 12/2010 | Poot et al. | 345/156 |
| 2011/0034244 | A1 * | 2/2011 | Marks et al. | 463/30 |

(Continued)

OTHER PUBLICATIONS

3db Solution product information, 1 page. http://www.3dbsolution.com/products.php.

(Continued)

*Primary Examiner* — Dwayne Bost
*Assistant Examiner* — Ivelisse Martinez Quiles

(57) ABSTRACT

A system for human interaction based upon intention detection. The system includes a sensor for providing information relating to a posture of a person detected by the sensor, a processor, and a display device. The processor is configured to receive the information from the sensor and process the received information in order to determine if an event occurred. This processing includes determining whether the posture of the person indicates a particular intention, such as attempting to take a photo. If the event occurred, the processor is configured to provide an interaction with the person via the display device such as displaying a message or the address of a web site.

18 Claims, 3 Drawing Sheets

(56) References Cited

U.S. PATENT DOCUMENTS

| | | | | |
|---|---|---|---|---|
| 2011/0107216 | A1* | 5/2011 | Bi | 715/716 |
| 2011/0128384 | A1 | 6/2011 | Tiscareno | |
| 2011/0175810 | A1* | 7/2011 | Markovic et al. | 345/158 |
| 2011/0262002 | A1* | 10/2011 | Lee | 382/103 |
| 2011/0301934 | A1* | 12/2011 | Tardif | 704/1 |
| 2012/0119985 | A1* | 5/2012 | Kang | 345/156 |
| 2012/0159404 | A1* | 6/2012 | Vasireddy et al. | 715/863 |
| 2012/0176303 | A1* | 7/2012 | Miyake | 345/156 |
| 2013/0278493 | A1* | 10/2013 | Wei et al. | 345/156 |
| 2014/0089866 | A1* | 3/2014 | Mongia et al. | 715/863 |

OTHER PUBLICATIONS

Durrant, "Automics: Souvenir Generating Photoware for Theme Parks", ACM CHI 2011, 10 pages.

Elmezain, "Posture and Gesture Recognition for Human-Computer Interaction", Advanced Technologies, pp. 415-440.

Khan, "Face and Arm-Posture Recognition for Secure Human-Machine Interaction", IEEE SMC 2008, 7pages.

Koppel, "Chained Displays: Configurations of Public Displays Can Be Used to Influence Actor-, Audience-, and Passer-By Behavior", ACM CHI 2012, pp. 317-326.

Kuikkaniemi, "From Space to Stage: How Interactive Screens Will Change Urban Life", IEEE Computer Society, Jun. 2011, pp. 40-47.

Müller, "Jörg, Persuasion with Smart Digital Signage", ACM CHI 2008, pp. 1-4.

Müller, "Looking Glass: A Field Study on Noticing Interactivity of a Shop Window", ACM CHI 2012, pp. 297-306.

Picsolve product information on Ride Photography, 9 pages. http://picsolve.com/photography_services/ride_photography.aspx.

Rehg, "Vision for a Smart Kiosk", Computer Vision and Pattern Recognition, Jun. 1997, pp. 690-696.

Truong, "Preventing Camera Recording by Designing a Capture-Resistant Environment", Ubicomp 2005, pp. 1-14.

Vogel, "Interactive Public Ambient Displays: Transitioning from Implicit to Explicit, Public to Personal, Interaction with Multiple Users", ACM UIST 2004, 10 pages.

* cited by examiner

HUMAN INTERACTION SYSTEM BASED UPON REAL-TIME INTENTION DETECTION

BACKGROUND

One of the challenges for digital merchandising is how to bridge the gap between attracting attention of potential customers and engaging with those customers. One of the attempts to bridge this gap is the Tesco Virtual Supermarket, which allows customers to buy groceries to be delivered later by using their mobile devices to capture QR codes associated with virtual products as represented by imagery replicates of products. This method works well for people buying basic products, such as groceries, in a fast-paced environment with one benefit being time-saving.

For discretionary purchases, however, it can be a challenge to convert a potential customer or hesitant shopper to a confident buyer. One example is the photo kiosk operation at public attractions such as theme parks, where customers can purchase photos of themselves on a theme park ride. While the operators have invested in equipment and personnel trying to sell these high-quality photos to customers, empirical evidence suggests that their photo purchase rate is low, resulting in a low return on investment. The main reason appears to be that most customers opt to use their mobile devices to take snapshots from the photo preview displays, instead of purchasing the photos.

For a typical digital signage or kiosk, the visual representation of merchandise is targeted to help promote the merchandise. For certain merchandise, however, such a visual representation could actually impede the sales. In the case of the preview display at theme parks, while it is necessary for potential customers to preview and decide whether to purchase the merchandise (digital or physical photo), it also exposes the merchandise that can be copied, albeit at lower quality, by the customers with their cameras. Such action renders the original content valueless to the operator despite the investment.

SUMMARY

A system for human interaction based upon intention detection, consistent with the present invention, includes a display device for electronically displaying information, a sensor for providing information relating to a posture of a person detected by the sensor, and a processor electronically connected with the display device and sensor. The processor is configured to receive the information from the sensor and process the received information in order to determine if an event occurred. This processing involves determining whether the posture of the person indicates a particular intention. If the event occurred, the processor is configured to provide an interaction with the person via the display device.

A method for human interaction based upon intention detection, consistent with the present invention, includes receiving from a sensor information relating to a posture of a person detected by the sensor and processing the received information in order to determine if an event occurred. This processing step involves determining whether the posture of the person indicates a particular intention. If the event occurred, the method includes providing an interaction with the person via a display device.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include a human interaction system that is capable of identifying potential people of interest in real-time and interacting with such people through real-time or time-shifted communications. The system includes a dynamic display device, a sensor, and a processor device that can capture and detect certain postures in real-time. The system can also include server software application run by the service providers and client software run on user's mobile devices. Such system enables service providers to identify, engage, and transact with potential customers, who also benefit from targeted and nonintrusive services.

Figure 1:
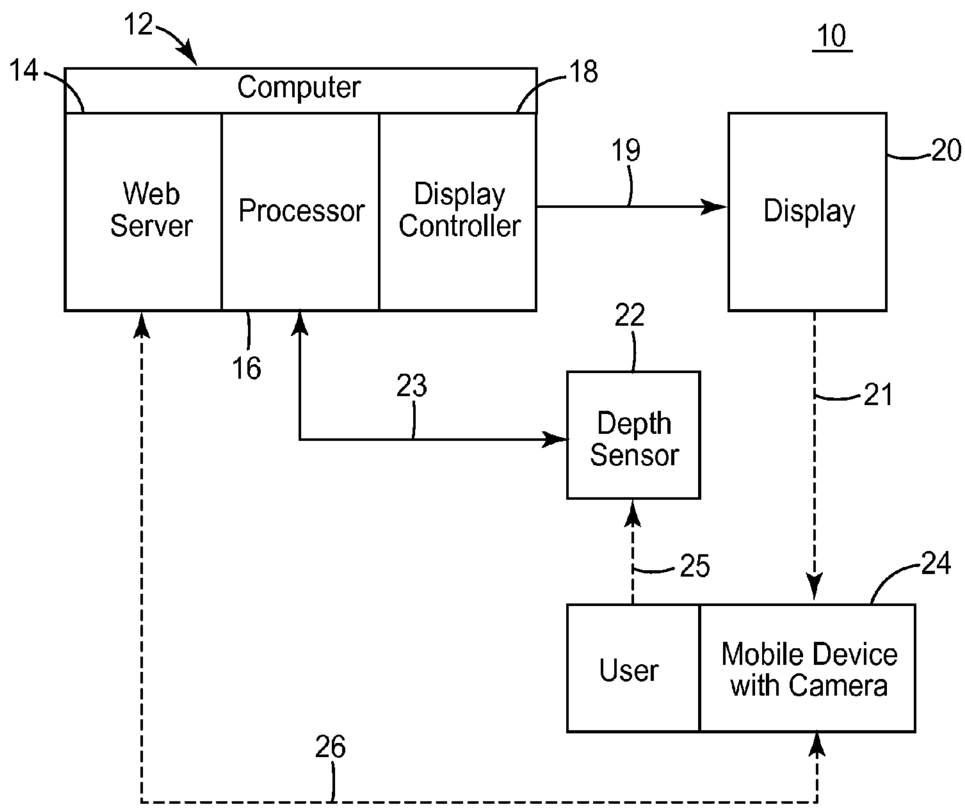
FIG. 1 is a diagram of a system for customer interaction based upon intention detection.

FIG. 1 is a diagram of a system 10 for customer interaction based upon intention detection. System 10 includes a computer 12 having a web server 14, a processor 16, and a display controller 18. System 10 also includes a display device 20 and a depth sensor 22. Examples of an active depth sensor include the KINECT sensor from Microsoft Corporation and the sensor described in U.S. Patent Application Publication No. 2010/0199228, which is incorporated herein by reference as if fully set forth. The sensor can have a small form factor and be placed discretely so as to not attract a customer's attention. Computer 10 can be implemented with, for example, a laptop personal computer connected to depth sensor 22 through a USB connection 23. Alternatively, system 10 can be implemented in an embedded system or remotely through a central server which monitors multiple displays. Display device 20 is controlled by display controller 18 via a connection 19 and can be implemented with, for example, an LCD device or other type of display (e.g., flat panel, plasma, projection, CRT, or 3D).

In operation, system 10 via depth sensor 22 detects, as represented by arrow 25, a user having a mobile device 24 with a camera. Depth sensor 22 provides information to computer 12 relating to the user's posture. In particular, depth sensor 22 provides information concerning the position and orientation of the user's body, which can be used to determine the user's posture. System 10 using processor 16 analyzes the user's posture to determine if the user appears to be taking a photo, for example. If such posture (intention) is detected, computer 12 can provide particular content on display device 20 relating to the detected intention, for example a QR code can be displayed. The user upon viewing the displayed content may interact with the system using mobile device 24 and a network connection 26 (e.g., Internet web site) to web server 14.

Display device 20 can optionally display the QR code with the content at all times while monitoring for the intention posture. The QR code can be displayed in the bottom corner, for example, of the displayed picture such that it does not interfere with the viewing of the main content. If intention is detected, the QR code can be moved and enlarged to cover the displayed picture.

Figure 2:
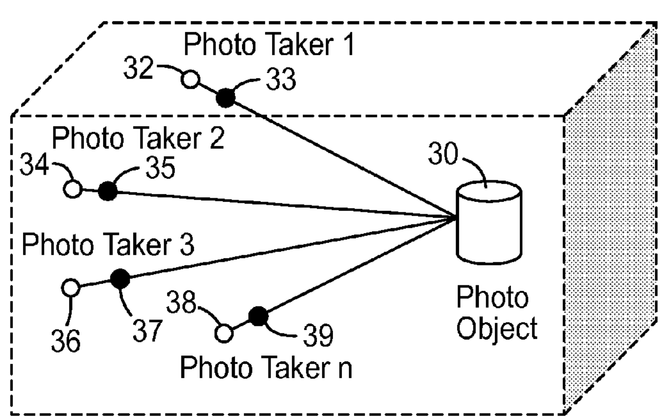
FIG. 2 is a diagram representing ideal photo taking posture.

In this exemplary embodiment, the principle of detecting a photo taking intention (or posture) is based on the following observations. The photo taking posture is uncommon; therefore, it is possible to differentiate from normal postures such as customers walking by or simply watching a display. The photo taking postures from different people share some universal characteristics, such as the three-dimensional position of a camera relative to the head and eye and the object being photographed, despite different types of cameras and ways to use them. In particular, different people use their cameras differently, such as single-handed photo taking versus using two hands, and using an optical versus electronics viewfinder to take a photo. However, as illustrated in FIG. 2 where an object 30 is being photographed, photo taking postures tend to share the following characteristic: the eye(s), the viewfinder, and the photo object are roughly aligned along a virtual line. In particular, a photo taker 1 has an eye position 32 and viewfinder position 33, a photo taker 2 has an eye position 34 and viewfinder position 35, a photo taker 3 has an eye position 36 and viewfinder position 37, and a photo taker n has an eye position 38 and viewfinder position 39.

Figure 3:
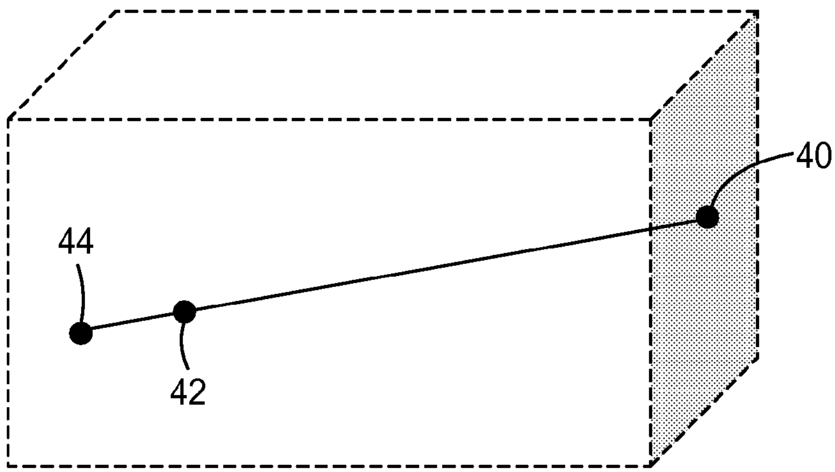
FIG. 3 is a diagram representing positions of an object, viewfinder, and eye in the ideal photo taking posture.

This observation is abstracted in FIG. 3, illustrating an object position 40 ($P_{object}$) of the object being photographed, a viewfinder position 42 ($P_{viewfinder}$), and an eye position 44 ($P_{eye}$). Positions 40, 42, and 44 are shown arranged along a virtual line for the ideal or typical photo taking posture. In an ideal implementation, sensing techniques enable precise detection of the positions of the camera viewfinder ($P_{viewfinder}$) or camera body as well as the eye(s) ($P_{eye}$) of the photo taker.

Figure 4:
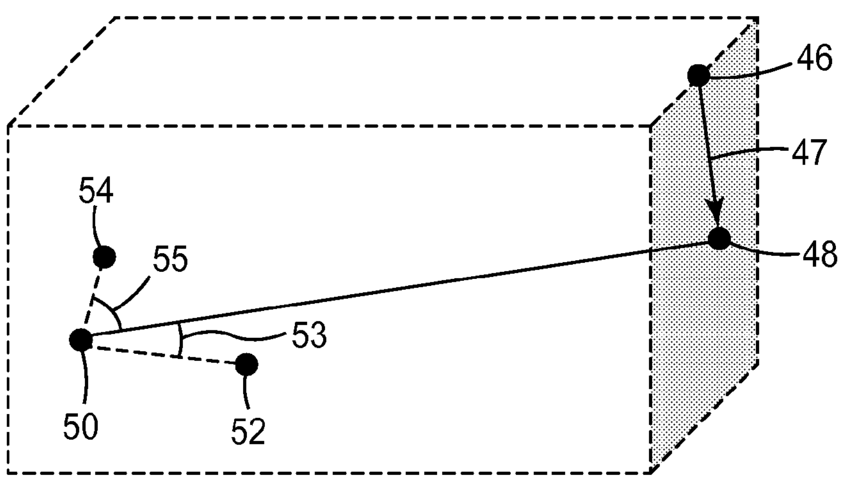
FIG. 4 is a diagram illustrating a detection algorithm for detecting a photo taking posture.

Embodiments of the present invention can simplify the task of sensing those positions through an approximation, as shown in FIG. 4, that maps well to the depth sensor positions. FIG. 4 illustrates the following for this approximation in three-dimensional space: a sensor position 46 ($P_{sensor}$) for sensor 22; a display position 48 ($P_{display}$) for display device 20 representing a displayed object being photographed; and a photo taker's head position 50 ($P_{head}$), right hand position 52 ($P_{rhand}$), and left hand position 54 ($P_{lhand}$). FIG. 4 also illustrates an offset 47 ($\Delta_{sensor\_offset}$) between the sensor and display positions 46 and 48, an angle 53 ($\theta_{rh}$) between the photo taker's right hand and head positions, and an angles 55 ($\theta_{lh}$) between the photo taker's left hand and head positions.

The camera viewfinder position is approximated with the position(s) of the camera held by the photo taker's hand(s), $P_{viewfinder} \approx P_{hand}$ ($P_{rhand}$ and $P_{lhand}$). The eye position is approximated with the head position, $P_{head} \approx P_{eye}$. The object position 48 (center of display) for the object being photographed is calculated with the sensor position and a predetermined offset between the sensor and the center of display, $P_{display} = P_{sensor} + \Delta_{sensor\_offset}$.

Therefore, the system determines if the detected event has occurred (photo taking) when the head ($P_{head}$) and at least one hand ($P_{rhand}$ or $P_{lhand}$) of the user form a straight line pointing to the center of display ($P_{display}$). Additionally, more qualitative and quantitative constraints can be added in spatial and temporal domains to increase the accuracy of the detection. For example, when both hands are aligned with the head-display direction, the likelihood of correct detection of photo taking is significantly higher. As another example, when the hands are either too close or too far away from the head, it may indicate different postures (e.g., pointing at the display) other than a photo taking event. Therefore, a hand range parameter can be set to reduce false positives. Moreover, since the photo-taking action is not instantaneous, a "persistence" period can be added after the first positive posture detection to ensure that such detection was not the result of false momentarily body or joint recognition by the depth sensor. The detection algorithm can determine if the user remains in the photo-taking posture for a particular time period, for example 0.5 seconds, to determine that an event has occurred.

In the real world the three points (object, hand, head) are not perfectly aligned. Therefore, the system can consider the variations and noise when conducting the intention detection. One effective method to quantify the detection is to use the angle between the two vectors formed by the left or right hand, head, and the center of display as illustrated in FIG. 4. The angle $\theta_{lh}$ (55) or $\theta_{rh}$ (53) equals zero when the three points are perfectly aligned and will increase when the alignment decreases. An angle threshold $\Theta_{threshold}$ can be set to flag a positive or negative detection based on real-time calculation of such angle. The value of $\Theta_{threshold}$ can be determined using various regression or classification methods (e.g., supervised or unsupervised learning). The value of $\Theta_{threshold}$ can also be based upon empirical data. In this exemplary embodiment, the value of $\Theta_{threshold}$ is equal to 12°.

Figure 5:
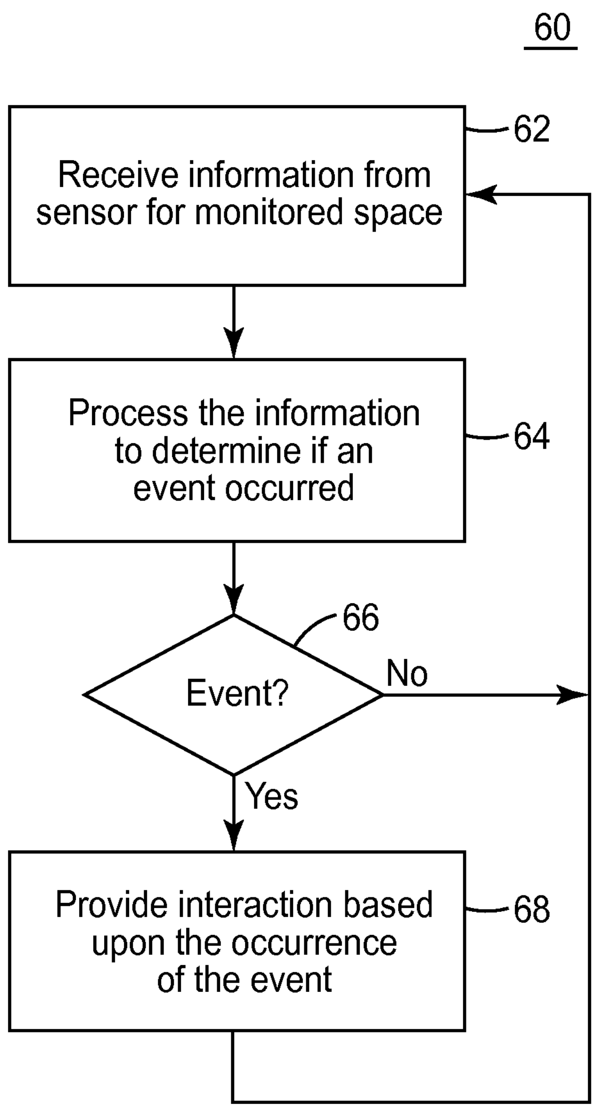
FIG. 5 is a flow chart of a method for customer interaction based upon intention detection.

FIG. 5 is a flow chart of a method 60 for customer interaction based upon intention detection. Method 60 can be implemented in, for example, software for execution by processor 16 in system 10. In method 60, computer 10 receives information from sensor 22 for the monitored space (step 62). The monitored space is an area in front of, or within the range of, sensor 22. Typically, sensor 22 can be located adjacent or proximate display device 20 as illustrated in FIG. 4, such as above or below the display device, to monitor the space in front of or within as area where the display can be viewed.

System 10 processes the received information from sensor 22 in order to determine if an event occurred (step 64). As described in the exemplary embodiment above, the system can determine if a person in the monitored space is attempting to take a photo based upon the person's posture as interpreted by analyzing the information from sensor 22. If an event occurred (step 66), such as detection of a photo taking posture, system 10 provides interaction based upon the occurrence of the event (step 68). For example, system 10 can provide on display device 20 device a QR code, which when captured by the user's mobile device 24 provides the user with a connection to a network site such as an Internet web site where system 10 can interact with the user via the user's mobile device. Aside from a QR code, system 10 can display on display device 20 other indications of a web site such as the address for it. System 10 can also optionally display a message on display device 20 to interact with the user when an event is detected. As another example, system 10 can remove content from display device 20, such as an image of the user, when an event is detected.

Although the exemplary embodiment has been described with respect to a potential customer, the intention detection method can be used to detect the intention of others and interact with them as well.

Table 1 provides sample code for implementing the event detection algorithm in software for execution by a processor such as processor 16.

TABLE 1

Pseudo Code for Detection Algorithm

```
task photo_taking_detection( )
{
    Set center of display position P_display=(x_d, y_d, z_d)= P_sensor +
    Δ_sensor_offset ;
    Set angle threshold Θ_threshold ;
    while (people_detected & skeleton data available)
    {
        Obtain head position P_head= (x_h, y_h, z_h) ;
        Obtain left hand position P_lhand= (x_lh, y_lh, z_lh) ;
```

TABLE 1-continued

| Pseudo Code for Detection Algorithm |
| --- |
| 3D line vector $v_{head\text{-}display}=P_{head}P_{display}$ ;<br>3D line vector $v_{head\text{-}lhand}= P_{head}P_{lhand}$ ;<br>3D line vector $v_{head\text{-}rhand}= P_{head}P_{rhand}$ ;<br>Angle_LeftHand= 3Dangle($v_{head\text{-}display}$, $v_{head\text{-}lhand}$) ;<br>Angle_RightHand= 3Dangle($v_{head\text{-}display}$, $v_{head\text{-}rhand}$);<br>if (Angle_LeftHand < $\Theta_{threshold}$ \|\| Angle_RightHand < $\Theta_{threshold}$)<br>return Detection_Positive;<br>}<br>} |

The invention claimed is:

1. A system for human interaction based upon intention detection, comprising:

a display device for electronically displaying information;

a sensor for providing information relating to a posture of a person detected by the sensor; and a processor electronically connected with the display device and the sensor, wherein the processor is configured to:

receive the information from the sensor;

process the received information in order to determine if an even occurred by determining whether the posture of the person indicates a particular intention of the person by determining if the posture indicates the person is attempting to take a photo of the displayed information using a camera, wherein the person attempting to take the photo is physically operating the camera in the attempt to take the photo; and if the event occurred, provide an interaction with the person via the display device.

2. The system of claim 1, wherein the sensor comprises a depth sensor.

3. The system of claim 1, wherein the display device comprises a liquid crystal display device.

4. The system of claim 1, wherein the processor is configured to display a message on the display device if the event occurred.

5. The system of claim 1, wherein the processor is configured to display an indication of a network site on the display device if the event occurred.

6. The system of claim 1, wherein the processor is configured to remove content displayed on the display device if the event occurred.

7. The system of claim 1, wherein the processor is configured to provide the interaction during at least a portion of the occurrence of the event.

8. The system of claim 1, wherein the processor is configured to determine if the event occurred by determining if the posture of the person persists for a particular time period.

9. The method of claim 1, wherein the processing step includes determining if the event occurred by determining if the posture of the person persists for a particular time period.

10. The system of claim 1, wherein the processor is configured to determine if positions of the person's head and hand form a straight line pointing to the display.

11. The system of claim 1, wherein the processor is configured to determine if an angle between a first vector from the person's head to a center of the display and a second vector from the person's head to hand is less than a threshold value.

12. A method for human interaction based upon intention detection, comprising:

receiving from a sensor information relating to a posture of a person detected by the sensor;

processing the received information, using a processor, in order to determine if an event occurred by determining whether the posture of the person indicates a particular intention of the person by determining if the posture indicates the person is attempting to take a photo of a display device using a camera, wherein the person attempting to take the photo is physically operating the camera in the attempt to take the photo; and if the event occurred, providing an interaction with the person via said display device.

13. The method of claim 12, wherein the providing step includes displaying a message on the display device if the event occurred.

14. The method of claim 12, wherein the providing step includes displaying an indication of a network site on the display device if the event occurred.

15. The method of claim 12, wherein the providing step includes removing content displayed on the display device if the event occurred.

16. The method of claim 12, wherein the providing step occurs during at least a portion of the occurrence of the event.

17. The method of claim 12, wherein the processing step includes determining if positions of the person's head and hand form a straight line pointing to the object.

18. The method of claim 12, wherein the processing step includes determining if an angle between a first vector from the person's head to the object and a second vector from the person's head to hand is less than a threshold value.

* * * * *

UNITED STATES PATENT AND TRADEMARK OFFICE

CERTIFICATE OF CORRECTION

PATENT NO. : 9,081,413 B2
APPLICATION NO. : 13/681469
DATED : July 14, 2015
INVENTOR(S) : Shuguang Wu et al.

It is certified that error appears in the above-identified patent and that said Letters Patent is hereby corrected as shown below:

In the claims,

Col. 5, line 25, in Claim 1, delete "even" and insert -- event --.

Col. 6, line 4, in Claim 9, delete "method" and insert -- system --.

Signed and Sealed this
Eighth Day of March, 2016

Michelle K. Lee

Michelle K. Lee
*Director of the United States Patent and Trademark Office*